(12) United States Patent
Heimberger et al.

(10) Patent No.: US 7,573,374 B2
(45) Date of Patent: Aug. 11, 2009

(54) METHOD FOR OPERATING AN ENVIRONMENTAL RECOGNITION SYSTEM OF A VEHICLE, IN PARTICULAR, A PROXIMATE REGION RECOGNITION OR PARKING ASSISTANCE SYSTEM AND ASSOCIATED SYSTEM

(75) Inventors: Markus Heimberger, Tamm (DE); Heinrich Gotzig, Heilbronn (DE); Klaus Hoffsommer, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 329 days.

(21) Appl. No.: 11/717,652

(22) Filed: Mar. 14, 2007

(65) Prior Publication Data

US 2007/0219721 A1 Sep. 20, 2007

(30) Foreign Application Priority Data

Mar. 16, 2006 (DE) ................. 10 2006 013 936

(51) Int. Cl.
*B60Q 1/00* (2006.01)
(52) U.S. Cl. .................. 340/435; 340/436; 340/932.2; 701/300
(58) Field of Classification Search ................. 340/435, 340/436, 932.2; 701/300, 301
See application file for complete search history.

(56) References Cited

U.S. PATENT DOCUMENTS 4,931,930 A * 6/1990 Shyu et al. ................... 701/36
5,291,207 A * 3/1994 Kikuchi et al. ................ 342/70
5,508,974 A * 4/1996 Meyer et al. .................. 367/99
7,148,791 B2 * 12/2006 Grisham et al. ............. 340/435
2005/0275513 A1* 12/2005 Grisham et al. ............. 340/435
2007/0126564 A1* 6/2007 Lee et al. ..................... 340/435

FOREIGN PATENT DOCUMENTS

| DE | 36 37 165 | 5/1988 |
| DE | 38 13 083 | 11/1989 |
| DE | 42 44 345 | 7/1993 |
| DE | 43 35 728 | 4/1995 |
| DE | 4333357 A1 * | 4/1995 |
| DE | 102 47 971 | 5/2004 |
| EP | 0 671 015 | 1/1999 |
| EP | 1 140 950 | 4/2004 |

* cited by examiner

*Primary Examiner*—Eric M Blount
(74) *Attorney, Agent, or Firm*—Paul Vincent

(57) ABSTRACT

A method for operating an environmental recognition system of a vehicle, in particular, a proximate region recognition or parking assistance system, comprising sensors for detecting objects proximate the vehicle, wherein, during operation of the system, an object located in the detecting area of the sensors is recognized and the separation and/or the position of the object relative to the vehicle are determined. When disturbing signals occur and are recognized, a change of the separation and/or the position of the vehicle relative to the object are determined by information detected by other vehicle systems. A system for operating such a method is also disclosed.

6 Claims, 1 Drawing Sheet

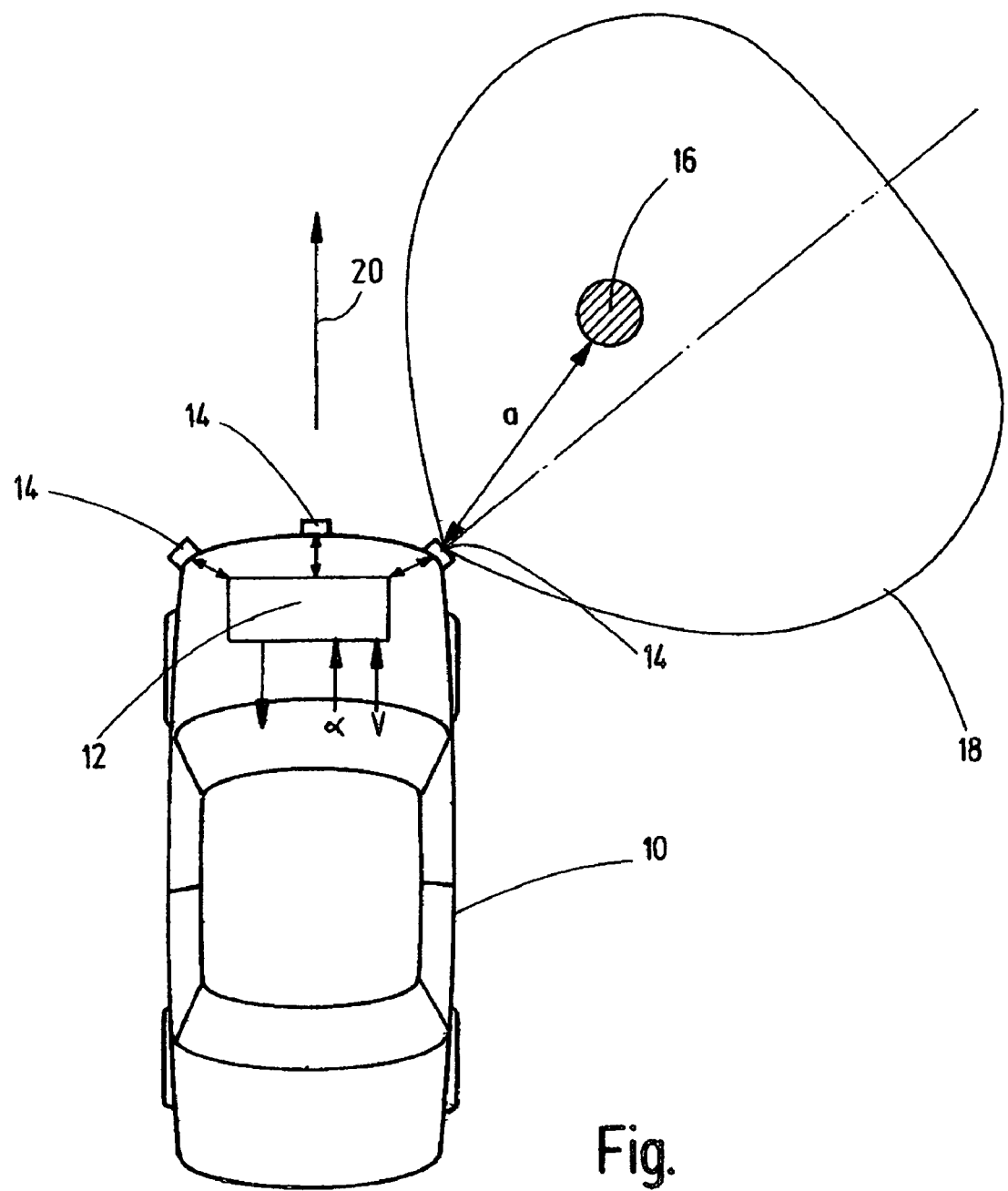

METHOD FOR OPERATING AN ENVIRONMENTAL RECOGNITION SYSTEM OF A VEHICLE, IN PARTICULAR, A PROXIMATE REGION RECOGNITION OR PARKING ASSISTANCE SYSTEM AND ASSOCIATED SYSTEM

This application claims Paris Convention priority of DE 10 2006 013 936.4 filed Mar. 16, 2006 the complete disclosure of which is hereby incorporated by reference.

BACKGROUND OF THE INVENTION

The invention concerns a method for operating an environmental recognition system of a vehicle, in particular, a proximate region recognition or parking assistance system, comprising sensors for detecting objects proximate the vehicle, wherein, during operation of the vehicle, an object which is present in the detecting area of the sensors is recognized and the separation and/or the position of the object relative to the vehicle is determined.

There are a variety of conventional methods of this type and associated systems. In particular, the methods thereby warn the vehicle driver of a collision and/or take corresponding measures in case a collision cannot be avoided.

The sensors that are used in such systems are generally based on ultrasound or radar technology. Ultrasound sensors are particularly susceptible to disturbances, especially when disturbing noise occurs. In the event that there are disturbing noise sources, such as e.g. motorcycles or trucks proximate the sensors, in addition to the actual useful signals, the sensors also receive disturbing signals which prevent proper detection of objects proximate the vehicle. The conventional systems can no longer detect objects in the detection area of the sensors.

It is therefore the underlying purpose of the present invention to ensure safe operation of the conventional environmental recognition systems, despite the occurrence of disturbing sources and signals.

SUMMARY OF THE INVENTION

This object is achieved in accordance with the invention with a method as described above, wherein, upon occurrence and detection of disturbing signals, a change of separation and/or the position of the vehicle relative to the object is determined using the separation determined prior to the occurrence of the disturbing signals and/or the position of the vehicle relative to the object determined prior to the occurrence of the disturbing signals, and using information detected by other vehicle systems. When disturbing signals occur and are detected, the method advantageously uses information concerning changes in relative separation and/or the position of the object recognized in the detecting area before the occurrence of disturbing signals. This information can be used to determine whether the vehicle further approaches the previously detected object and whether there is a danger of collision. The information detected by the other vehicle systems is thereby, in particular, independent of a possible disturbance source and the resulting disturbing signals.

In the event that objects are present in the detecting area of the sensors, these are advantageously communicated and/or displayed. A message to the driver may be issued optically or acoustically, in particular, using a screen display. A message or display is advantageously issued at regular time intervals.

In particular, when disturbing signals are recognized, an additional message or display may be issued to tell the driver that the following message or display concerning the change of separation and/or relative position between the vehicle and the object could be imprecise or wrong.

The information detected by the other vehicle systems preferably consists of position encoder signals, speed signals, camera signals and/or steering angle signals. Position encoder signals, speed signals and steering angle signals are generated in particular by braking systems, vehicle stabilization systems and/or navigation systems, and are therefore readily available. Camera signals may e.g. be obtained from camera monitoring of the vehicle surroundings and could therefore also be available. The above-mentioned signals are suitable, since they can be used to determine the direction and the respective location of the vehicle relative to a reference point which may, in particular, be the object detected by the environmental recognition system and irrespective of any possibly existing disturbing sources.

The information detected by other vehicle systems is advantageously stored on a bus system of the vehicle, wherein the inventive environmental recognition system has access to this bus system. Thus, when disturbing signals occur, the inventive environmental recognition system can directly access the information detected by the other vehicle systems and determine a change of separation and/or relative position between the vehicle and the object using this information.

The above-mentioned object is also achieved by an environmental recognition system of a vehicle, in particular, a proximate region recognition or parking assistance system which performs the inventive method during operation. A system of this type has corresponding sensors for detecting the proximate region and can advantageously be connected to the bus system of the vehicle.

Further details and advantageous embodiments of the invention can be extracted from the following detailed description of an embodiment of the invention.

BRIEF DESCRIPTION OF THE DRAWING

The FIGURE shows a top view of a vehicle which comprises the inventive parking assistance system.

DESCRIPTION OF THE PREFERRED EMBODIMENT

The FIGURE schematically shows a top view of a vehicle 10 which comprises an inventive parking assistance system 12. The parking assistance system 12 comprises a total of three ultrasound sensors 14 at the front side of the vehicle. The ultrasound sensors 14 emit acoustical signals and receive useful signals reflected in the detecting areas of the ultrasound sensors. When an object 16 is detected in the detecting area 18 of an ultrasound sensor 14 (as indicated in FIG. 1 as an example), the separation "a" between the vehicle and the object can e.g. be detected on the basis of the transit time between the emitted and received signals. Moreover, the position of the object relative to the vehicle can be determined e.g. by using so-called multibeam sensors.

When a disturbing noise source is located next to the vehicle 10, e.g. in the form of a motorcycle that generates a strong acoustical signal, the sensors 14 also receive disturbing signals in addition to the useful signals. The parking assistance system 12 is thereby designed such that it can detect disturbing signals on the basis of a comparison between the emitted and received signals. When such disturbing signals are detected, all received signals are suppressed.

Filtering the useful signals out of the received disturbing signals is technically very difficult or even impossible.

In order to determine a change of separation "a" or of the position of the vehicle 10 relative to the object 16, when received signals are suppressed, the parking assistance system 12 utilizes a velocity or speed signal v of the respective instantaneous vehicle velocity or speed, which is generated by another vehicle system, and the steering angle signal α of the respective instantaneous steering angle of the vehicle. From these two signals, the parking assistance system 12 can calculate a spatial change of the vehicle from the time at which no reliable statement is possible concerning the separation or the position of the object 16 using the ultrasound sensors 14 due to the occurrence and detection of the disturbing signals.

When the vehicle moves e.g. in the direction of arrow 20 at a speed or velocity v, the respective instantaneous separation "a" from the object can be calculated at the respective time.

Assuming that, during normal operation without disturbing signals, information about the separation between the vehicle 10 and the object 16 is communicated to the driver every 500 ms, the following may occur:

At time t=0, the stationary object 16 is detected by the front right ultrasound sensor 14 at a separation a=120 cm and the driver is informed.

At time t=1 ms, disturbing signals are produced for 2 s due to a motorcycle that approaches the vehicle.

If the vehicle does not move, the separation between the vehicle and the object 16 is still 120 cm at a time t=500 ms.

Should the vehicle move from time t=600 ms at a constant speed of 1 m/s in a straight line towards the object 16, the vehicle has moved by 40 cm at the second measuring time t=1000 ms.

On the basis of the known speed or velocity information, the parking assistance system 12 can now calculate that the vehicle has moved 40 cm in 400 ms, and that the separation from the obstacle at time t=1000 ms is only 80 cm. This value can be communicated to the driver 12.

When the direction of the vehicle does not change (the vehicle continues to move in a straight line towards the object 16), the path traveled between time t=1000 ms and T=1500 ms at a time t=1500 ms is 50 cm. The distance between the vehicle and the object 16 is then only 30 cm. The driver can be adequately warned through a corresponding message irrespective of the still existing disturbing signals and resulting ignorance of the input signals of the ultrasound sensors 14. The driver can stop the vehicle and prevent a collision.

We claim:

1. A method for operating an environmental recognition system, a proximate region recognition system, or a parking assistance system for a vehicle, the method comprising the steps of:
   a) detecting an object proximate the vehicle during operation of the system, the object being present in a detecting area of sensors;
   b) determining a separation and/or position of the object relative to the vehicle;
   c) recognizing disturbing signals; and
   d) calculating, using information detected by at least one additional vehicle system, a change in the separation and/or the relative position between the vehicle and the object using a separation determined prior to occurrence of the disturbing signals in step c).

2. The method of claim 1, wherein a presence of the object in the detecting area of the sensors is communicated and/or displayed.

3. The method of claim 1, wherein the occurrence of disturbing signals is communicated and/or displayed.

4. The method of claim 1, wherein information detected by the other vehicle systems comprises position encoder signals, speed or velocity signals, camera signals, and/or steering angle signals.

5. The method of claim 1, wherein the system is connected to a bus system of the vehicle, and the information detected by the other vehicle systems is stored on the bus system.

6. An environmental recognition system, a proximate region recognition system, or a parking assistance system for a vehicle, the system structured to execute the method of claim 1.

* * * * *